UNITED STATES PATENT OFFICE.

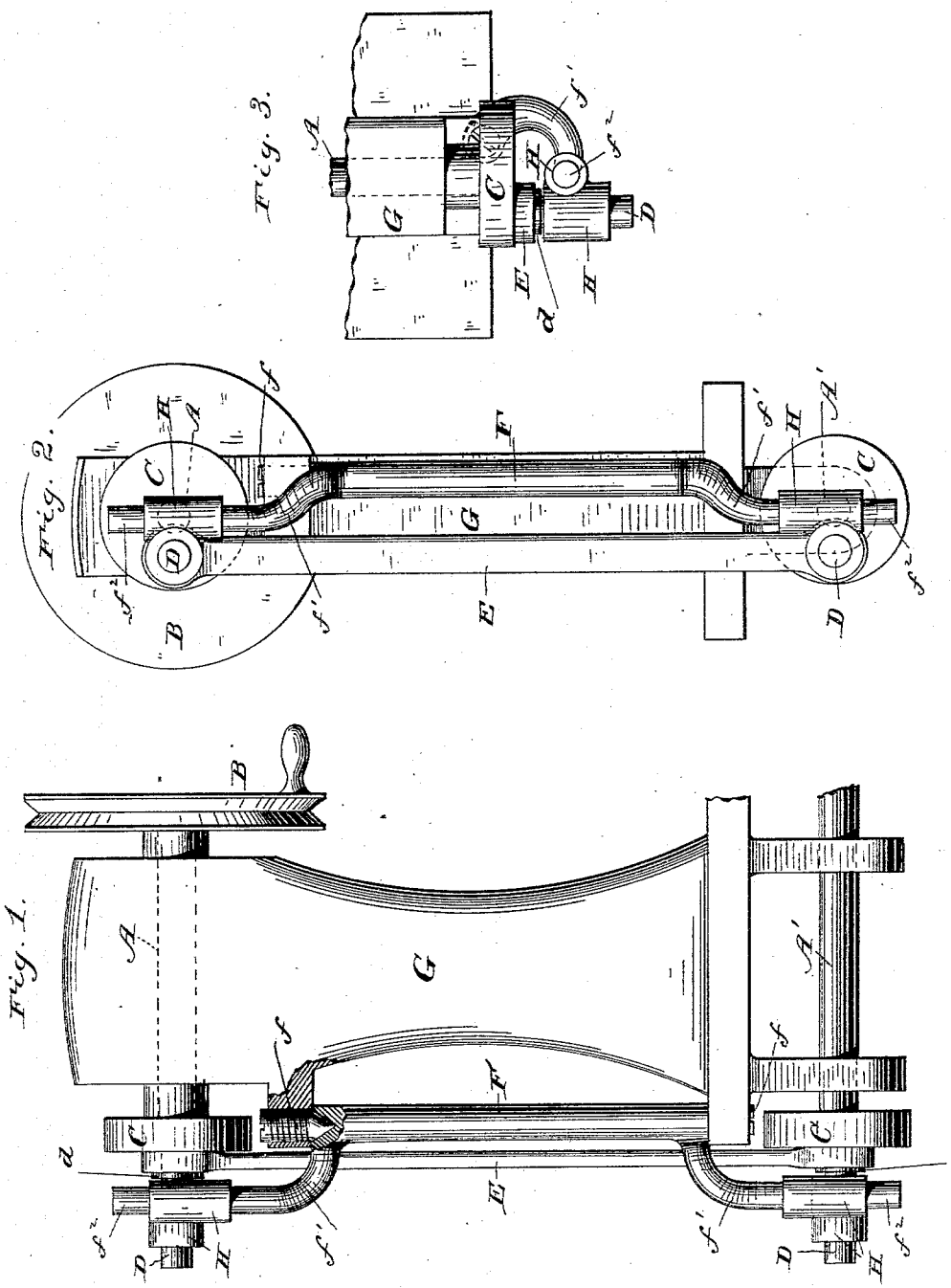

JAMES TRIPP, OF NEW YORK, N. Y.

MECHANICAL MOVEMENT.

SPECIFICATION forming part of Letters Patent No. 304,049, dated August 26, 1884.

Application filed July 11, 1884. (No model.)

*To all whom it may concern:*

Be it known that I, JAMES TRIPP, a citizen of the United States, residing at New York, in the county of New York and State of New York, have invented certain new and useful Improvements in Mechanical Movements, of which the following is a specification, reference being had therein to the accompanying drawings.

My invention relates to that class of mechanical movements adapted for the transmission of rotary motion from one shaft to another, the object of my invention being to produce a simple and effective mechanism for this purpose in which the two connected shafts will be caused to rotate coincidently or isochronously and in the same direction.

In carrying out my invention, I connect the crank-pins of two shafts by a pitman, said crank-pins being of suitable length to receive sleeve-pieces having openings or perforations at right angles to each other, adapted to loosely encircle said crank-pins and extensions of the arms of a rock-shaft, the axis of which is at right angles to the axes of the rotating shafts. Thus as one shaft is rotated the connecting-pitman will cause the other to revolve therewith, while the sleeve-pieces, being connected with the crank-pins and rock-shaft, will cause the latter to vibrate. As the rock-shaft will be in the middle of its movement at the moment when the crank-pins are on the "dead-center" or in line with the axes of the rotating shafts, the said pins, being connected with the said rock-shaft, will be carried over the dead-center thereby, and thus the driven shaft will be caused to continue its rotation in the same direction with the driving-shaft, completing its revolution in the same time with the latter.

Referring to the accompanying drawings, Figure 1 is a side elevation illustrating my invention. Fig. 2 is an end elevation, and Fig. 3 is a partial plan view, of the same.

A and A' are the driving and driven shafts, respectively, the former being provided with a pulley, B, by which motion may be imparted thereto. These shafts both have crank arms or disks C, carrying extended crank-pins D.

E is a pitman or connecting rod placed on the crank-pins D, and kept in position adjacent to the crank-disks by flanges or collars $d$ on the said crank-pins.

F is a rock-shaft having its axis at right angles to the axes of the rotating shafts A and A', and preferably pivoted on pointed screws $f$, tapped in some portion of the frame-work G, and entering conical recesses in the ends of the said rock-shaft. The rock-shaft F is provided with arms $f'$, curved or recessed, as shown in Fig. 3, to accommodate the movements of the pitman E, said arms having extensions $f^2$ arranged parallel with the shaft, and passing loosely through the sleeve-pieces H, placed loosely on the crank-pins D, outside of the pitman, the said sleeve-pieces having openings or perforations arranged at right angles to each other, through which pass the said crank-pins and the extensions $f^2$ of the arms of the rock-shaft. Motion being imparted to the driving-shaft, the pitman will convey the same to the driven shaft, while the sleeve-pieces, sliding in and out on the crank-pins D and up and down on the extensions of the arms of the rock-shaft, will cause the latter to vibrate, said rock-shaft, by its connection with the said crank-pins, assisting the latter over the dead-centers, and compelling the driven shaft to rotate in the same direction with the driving-shaft and with a movement uniform to that of the latter, so that the two shafts will both complete their revolutions in the same time. Thus the crank-pins and rock-shaft, by virtue of the sleeve-piece connections, will be caused to reciprocally co-operate, each assisting the other in its movements.

It will be understood that with my connecting mechanism hereinbefore described either shaft may be the driving and either the driven shaft, and also that the rotating shafts, instead of being one above the other, as shown, may be differently arranged, as by being both placed in the same horizontal plane.

I am aware of Patent No. 298,943, and hereby disclaim the construction therein shown; but What I do claim as my invention, and desire to secure by Letters Patent, is—

1. A mechanical movement consisting of the combination, with two rotary shafts having crank-pins, of a pitman connecting said crank-pins, a rock-shaft provided with arms, and having its axis at right angles to the axes of the rotary shafts, and sleeve-pieces sliding on said crank-pins, and loosely connecting the same with the arms of the said rock-shaft, substantially as set forth.

2. The combination, with the driving and driven shafts, pitman, crank-pins, and loosely-sliding sleeve-pieces, of the rock-shaft having curved or recessed arms to accommodate the movements of the said pitman, substantially as set forth.

3. The combination, with the driving and driven shafts and their crank-disks and crank-pins, of a pitman connecting said pins and arranged adjacent to said disks, sliding sleeve-pieces loosely placed on said pins outside of said pitman, and a rock-shaft having extended arms loosely encircled by said sleeve-pieces, substantially as set forth.

In testimony whereof I affix my signature in presence of two witnesses.

JAMES TRIPP.

Witnesses:
HENRY CALVER,
E. D. SMITH.